United States Patent
Kross

(10) Patent No.: US 8,834,904 B1
(45) Date of Patent: Sep. 16, 2014

(54) OIL-FREE VISCOELASTIC ELASTOMER GELS FOR APPLICATION TO HUMAN SKIN

(76) Inventor: Robert D. Kross, Bellmore, NY (US)

( * ) Notice: Subject to any disclaimer, the term of this patent is extended or adjusted under 35 U.S.C. 154(b) by 1935 days.

(21) Appl. No.: 10/964,982

(22) Filed: Oct. 14, 2004

Related U.S. Application Data

(60) Provisional application No. 60/510,398, filed on Oct. 14, 2003.

(51) Int. Cl.
| | | |
|---|---|---|
| *A61K 8/00* | (2006.01) | |
| *A61K 8/02* | (2006.01) | |
| *A61Q 1/12* | (2006.01) | |
| *A61Q 90/00* | (2009.01) | |

(52) U.S. Cl.
USPC ............... 424/401; 424/70.11; 424/78.03; 424/78.17; 424/407

(58) Field of Classification Search
None
See application file for complete search history.

(56) References Cited

U.S. PATENT DOCUMENTS

| | | | | |
|---|---|---|---|---|
| 5,976,516 | A * | 11/1999 | Sakai et al. | 424/70.1 |
| 6,420,475 | B1 * | 7/2002 | Chen | 524/505 |
| 2002/0013565 | A1 * | 1/2002 | Cinelli et al. | 604/385.03 |

* cited by examiner

*Primary Examiner* — Debbie K Ware
(74) *Attorney, Agent, or Firm* — Edwin D. Schindler

(57) ABSTRACT

A composition article, which may be applied to human, includes a non-oil thermoplastic gelatinous elastomer composition, which is formed into a composite by heating with a substrate material. The gelatinous elastomer includes a hydrogenated styrene/isoprene/butadiene block copolymer, at least one polymer or copolymer of the group poly(styrene-butadiene-styrene), poly(styrene-isoprene), poly(styrene-isoprene-styrene), poly(styrene-isoprene), poly(styrene-ethylene-propylene), poly(styrene-ethylene-propylene-styrene), poly(styrene-ethylene-butylene-styrene) or poly(styrene-ethylene-butylene), and a non-oil plasticizer.

13 Claims, No Drawings

OIL-FREE VISCOELASTIC ELASTOMER GELS FOR APPLICATION TO HUMAN SKIN

CROSS-REFERENCE TO RELATED APPLICATION

Cross-Reference to Provisional Patent Application

The inventor claims domestic priority, pursuant to 35 U.S.C. §119(e), on the basis of U.S. Provisional Patent Application No. 60/510,398, filed Oct. 14, 2003, the entire disclosure of which shall be deemed to be incorporated by reference herein.

BACKGROUND OF THE INVENTION

1. Field of the Invention

The present invention relates, generally, to an oil-free viscoelastic elastomer gel, which may be shaped and molded for being beneficially applied to a person's skin.

More particularly, the present invention relates to a composite article comprising a thermoplastic, heat-formable, and heat reversible, gelatinous elastomer composition, which is formed into a composite by heating with at least one substrate material, which may be applied to human skin. The elastomer composition is formed from one or more hydrogenated styrene/isoprene/butadiene block polymers and specialty esters and/or conventionally known compositions used to provide esthetic properties and emolliency to cosmetic formulations.

The composite articles of the invention, which include an oil-free thermoplastic, gelatinous elastomer composition, can be used to form viscoelastic elastomer-based gels that are well-suited for topical application (e.g., being appropriately moldable and formable into a variety of shapes and conformations.)

2. Description of the Prior Art

The prior art discloses a large number of compositions comprised of oil-extended thermoplastic block copolymers. Such teachings are to be found in U.S. Pat. Nos. 4,369,284; 4,618,213; 5,153,254; 5,633,286; 6,148,830; and 6,552,109, with the compositions disclosed therein generally including certain low viscosity triblock copolymers which have been plasticized with high levels of oil.

The inherent properties of the gelatinous elastomer compositions and articles made therefrom are many, with the gel compositions taught by the enumerated patents above exhibiting high dimensional stability, crack, tear, craze and creep resistance, excellent tensile strength and high elongation, long-service life under stress and capability of repeated handling, excellent processing ability for cast molding, are nontoxic, nearly tasteless and odorless, extremely soft and strong, highly flexible and possessing elastic memory, substantially with little or no plasticizer bleed out.

The oil plasticizers utilized by the prior art, which are generally present at levels significantly higher than the polymers themselves (typically about 3- to 15-times higher), serve a major role. The plasticized gels resist tearing under tensile loads or dynamic deformation, unlike unplasticized triblock copolymer gels, such as styrene-ethylene-butylene-styrene ("SEBS") and styrene-ethylene-propylene-stryene ("SEPS") gels, which possess high tensile strength, but will catastrophically snap apart into two reflective clean smooth surfaces when cut or notched under tensile or dynamic loads. A plasticized gel can be stretched by a first tensile load with uniform deformation to a measured length, and upon the application of higher tensile loads, the gel can be further extended without breaking. Upon release, the gel returns immediately to its original shape and any necking quickly disappears.

The nature of the oil plasticizers that are used in these products limits the application of these gels in a number of personal care, topical skin products. Examples of representative commercially available plasticizing oils include polybutenes, hydrogenated polybutenes, polybutenes with epoxide functionality at one end of the polybutene polymer, liquid poly(ethylene/butylene), liquid heterotelechelic polymers of poly(ethylene/butylene/styrene) with epoxidized polyisoprene, and poly(ethylene/butylene) with epoxidized polyisoprene. Also cited as appropriate examples of various commercially oils are ARCO PRIME, DURAPRIME and TUFFLO (trademarks) oils, and other white mineral oils, such as the BAYOL (trademark) series. The oily nature of these materials can often make them unsuitable for use of the gels for cosmetic application and topical medical delivery systems.

As used in this disclosure, the linear triblock co-polymers poly(styrene-ethylene-ethylene-propylene-styrene) is denoted by the abbreviation "SEEPS"; poly(styrene-ethylene-butylene-styrene) is denoted by the abbreviation "SEBS"; poly(styrene-ethylene-propylene-styrene) is denoted by the abbreviation "SEPS"; the branched copolymers poly(styrene-ethylene-propylene) is denoted by the abbreviation "SEP"; and poly(styrene-ethylene-butylene) is denoted by the abbreviation "SEB."

The present invention is the result of efforts to develop a way for modifying the rigidity of these triblock copolymers, such as SEBS and SEPS gels, so as to provide a similar type of viscoelasticity in gels that are more readily applicable to personal care products in the cosmetic and medical delivery fields.

SUMMARY OF THE INVENTION

It is, therefore, an object of the present invention to provide a viscoelastic elastomer gel, which includes a thermoplastic, heat-formable, and heat reversible, gelatinous elastomer composition, for application to a person's skin, which avoids the use of oil plasticizers, but which is nevertheless highly flexible and possesses high resistance to tearing under tensile loads or dynamic deformation.

The foregoing and related objects are achieved by the oil-free viscoelastic elastomer gel of the present invention, which comprises a composite article having a thermoplastic, heat formable and heat reversible gelatinous elastomer composition, which is formed into a composite by heat with one or more substrate materials. The gelatinous elastomer includes at least one hydrogenated styrene/isoprene/butadiene block copolymers and at least one polymer or copolymer of the group poly(styrene-butadiene-styrene), poly(styrene-butadiene), polystyrene-isoprene-styrene), poly(styrene-isoprene), poly(styrene-ethylene-propylene), poly(styrene-ethylene-propylene-styrene), poly(styrene-ethylene-butylene-styrene) and poly(styrene-ethylene-butylene). Preferably, the polymers or copolymers are the KURARAY SEPTON 4000 Series Block Polymer Nos. 4033, 4045, 4055, made from hydrogenated styrene isoprene/butadiene styrene block copolymers. The hydrogenated styrene block polymer preferably includes 2-methyl-1,3-butadiene and 1,3-butadiene.

Optionally, the gelatinous elastomer should also include at least one specialty esters and/or other conventionally utilized materials for providing an esthetic property and emolliency to a cosmetic formulation. The specialty esters found to be useful are those composed of long-chain fatty acids esterfied with long-chain alcohols and gycols. Commercial brand names (trademarks) for these ester products include those in the HEST, CRODAMOL, ALZO and DUMOL series, and the like. Chemical names of these specialty esters generally include isodecyl- and octyl-based esters such as iso- and iso-octyl dodecyl myristate and isostearate, isodecyl- and isooctyl isocetyl stearate and isostearate, Glycereth-18 ethyl hexanoate, octyldodecyl myristate, etc. Generally, esterified combinations of both alcohols/gycols and acids, with $C_8$-$C_{24}$ carbon chains, are appropriate to impart both beneficial cosmetic and medical delivery benefits to the elastomer. Preferred combinations are those which, because of chain length and steric structure, are liquid at ambient temperatures, or are readily liquefiable near ambient temperatures. The other conventionally utilized materials include various animal-derived non-oil materials, such as lanolin and its derivatives, squalene and cholesterol esters.

The elastomer gels of the present invention have also been found suitable as solvent bases for dissolution, and subsequent release of a variety of cosmetic and cosmeceutical materials of recognized benefit to human skin.

Other objects and features of the present invention will become apparent when considered in view of the following detailed description of the invention, which provides certain preferred embodiments and examples of the present invention. It should, however, be noted that the accompanying detailed description is intended to discuss and explain only certain embodiments of the claimed invention and is not intended as a means for defining the limits and scope of the invention.

DETAILED DESCRIPTION OF THE PREFERRED EMBODIMENTS

The gelatinous elastomer composition and oriented gel composition are generally prepared by blending together the components, including other additives, as desired, at ambient temperature to about 100° C. to form a paste-like mixture, and then heating (or further heating, as necessary) the mixture uniformly to about 150° C. to about 200° C. until a homogeneous molten blend is obtained. The temperatures selected depend upon such factors as the viscosity of the specialty esters or specialty components and the amounts and nature of the polymer mixtures used. These components blend easily in the melt and a heated vessel equipped with a stirrer is all that is required. Conventional vessel with pressure and/or vacuum application can be utilized in forming typical batches of the instant compositions from relatively small amounts (e.g., from about 40 lbs., or less, to about 10,000 lbs, or more.) For example, in a large vessel, inert gases can be employed for removing the composition from a closed vessel at the end of mixing and a partial vacuum can be applied to remove any entrapped bubbles. Stirring rates utilized for large batches can range from approximately (and somewhat less than) 10 rpm to about 40 rpm, or even higher.

For use in the present invention, the molecular chain lengths (molecular weights) of the triblock and branch copolymers must be sufficient to meet the high solution Brookfield Viscosities requirements described herein that are necessary for making the extremely soft and strong gel compositions. The high viscosity triblock and branched copolymers: SEEPS, SEBS, SEPS, $(SEB)_n$ and $(SEP)_n$ can be measured under varying conditions of weight-percent solution concentrations in toluene. The most preferred and useful triblock and branched copolymers selected have Brookfield Viscosity values ranging from about 1,800 cps to about 8,000 cps and higher, when measured at 20 weight-percent solution in toluene at 25° C., about 4,000 cps to about 40,000 cps and higher, when measured at 25 weight-percent solids solution in toluene. Typical examples of Brookfield Viscosity values for branched copolymers $(SEB)_n$ and $(SEP)_n$ at 25 weight-percent solids solution in toluene at 25° C. can range from about 3,500 cps to about 30,000 cps and higher; more commonly, about 9,000 cps and higher. Other preferred and acceptable triblock and branched copolymers can exhibit viscosities (as measured with a Brookfield model RVT viscometer at 25° C. at 10 weight-percent solution in toluene) of about 400 cps and higher and at 15 weight-percent solution in toluene of about 5,600 cps and higher. Other acceptable triblock and branched copolymers can exhibit about 8,000 to about 20,000 cps at 20 weight percent solids solution in toluene at 25° C.

Examples of most preferred high viscosity triblock and branched copolymers can have Brookfield viscosities, at 5 weight-percent solution in toluene at 30° C., of from about 40 to about 50 cps and higher. While less preferred polymers can have a solution viscosity at 10 weight-percent solution in toluene at 30° C. of about 59 cps and higher. The high viscosity triblock, radial, star-shaped and multiarm copolymer of the present invention can have a broad range of styrene end block to ethylene and butylene center block ratio of about 20:80 or less to about 40:60 or higher. Examples of high viscosity triblock copolymers that can be utilized to achieve one or more of the novel properties of the present invention are styrene-ethylene-butylene-styrene block copolymers (SEBS) available from Shell Chemical Company and Pecten Chemical Company (divisions of Shell Oil Company) under trade designations Kraton G 1651, Kraton G 1654X, Kraton G 4600, Kraton G 4609, and the like. Shell Technical Bulletin SC:1393-92 gives solution viscosity as measured with a Brookfield model RVT viscometer at 25° C. for Kraton G 1654X at 10% weight in toluene of approximately 400 cps and at 15% weight in toluene of approximately 5,600 cps. Shell publication SC:68-79 gives solution viscosity at 25° C. for Kraton G 1651 at 20 weight-percent in toluene of approximately 2,000 cps. When measured at 5 weight-percent solution in toluene at 30° C., the solution viscosity of Kraton G 1651 is about 40. Examples of high viscosity SEBS triblock copolymers includes Kuraray's SEBS 8006, which exhibits a solution viscosity at 5 weight-percent at 30° C. of about 51 cps. Kuraray's Septon 8005 SEBS is similarly applicable.

Kuraray's 4055 SEEPS (styrene-ethylene/ethylene-propylene-styrene) block polymer, made from hydrogenated styrene isoprene/butadiene block copolymer or, more specifically, made from hydrogenated styrene block polymer with 2-methyl-1,3-butadiene and 1,3-butadiene, exhibits a viscosity at 5 weight-percent solution in toluene at 25° C. of about 90 mPa-S, and at 10 weight-percent about 5800 mPa-S. Kuraray's Septon 4044 and 4033 SEEPS are similarly useful. Kuraray's 2006 SEPS polymer exhibits a viscosity at 20 weight-percent solution in toluene at 25° C. of about 78,000 cps, at 5 weight-percent of about 27 mPa-S, at 10 weight percent of about 1220 mPa-S, and at 20 weight-percent 78,000 cps. Kuraray SEPS 2005 polymer exhibits a viscosity at 5 weight-percent solution in toluene at 30° C. of about 28 mPa-S, at 10 weight percent of about 1200 mPa-S, and at 20 weight percent 76,000 cps. Other grades of SEBS, SEPS, $(SEB)_n$, $(SEP)_n$ polymers can also be utilized in the present invention, provided such polymers exhibit the required high viscosity. Such SEBS polymers include (high viscosity) Kraton G 1855X, which has a specific gravity of 0.92, Brookfield Viscosity of a 25 weight-percent solids solution in toluene at 25° C. of about 40,000 cps, or about 8,000 to about 20,000 cps at a 20 weight-percent solids solution in toluene at 25° C. The styrene to ethylene and butylene (S:EB) weight ratios for the Shell designated polymers can have a low range of 20:80 or less. Although the typical ratio values for Kraton G 1651, 4600, and 4609 are approximately about 33:67 and for Kraton G 1855X approximately about 27:73, Kraton G 1654X (a lower molecular weight version of Kraton G 1651 with somewhat lower physical properties, such as lower solution and melt viscosity) is approximately about 31:69; these ratios can vary broadly from the typical product specification values. In the case of Kuraray's SEBS polymer 8006 the S:EB weight ratio is about 35:65. In the case of Kuraray's 2005, 2006 and 4055, the S:EEP weight ratios are 20, 35 and 30, respectively. Much like S:EB ratios of SEBS and $(SEB)_n$, the S:EP ratios of very high viscosity SEPS, $(SEP)_n$ copolymers are expected to be about the same and can vary broadly. The S:EB, S:EP weight ratios of high viscosity SEBS, SEPS, $(SEB)_n$ and $(SEP)_n$ useful in forming the gel compositions of the invention can range from lower than about 20:80 to above about 40:60, and higher. More specifically, the values can be 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, 47:53, 48:52, 49:51, 50:50, 51:49, etc. Other ratio values of less than 19:81, or higher than 51:49, are also possible.

Broadly, the styrene block to elastomeric block ratio of the high viscosity triblock, radial, star-shaped, and multiarm copolymers of the present invention is about 20:80 to about 40:60, or higher, less broadly about 31:69 to about 40:60; preferably about 32:68 to about 38:62; more preferably about 32:68 to about 36:64; particularly more preferably about 32:68 to about 34:66; even more preferably about 33:67 to about 36:64; and most preferably about 33:67. In accordance with the present invention, triblock copolymers, such as, for example, Kraton G 1654X having ratios of 31:69 or higher, and can be used, and do exhibit about the same physical properties in many respects to Kraton G 1651, while Kraton G 1654X, with ratios below 31:69, may also be use, but they are less preferred due to their decrease in the desirable properties of the final gel. Other polymers and copolymers (in major or minor amounts) can be selectively melt blended with one or more of the high viscosity polymers as mentioned above without substantially decreasing the desired properties; these polymers include (SBS) styrene-butadiene-styrene block copolymers, (SIS) styrene-isoprene-styrene block copolymers, (low styrene content SEBS) styrene-ethylene-butylene-styrene block copolymers, (SEP) styrene-ethylene-propylene block copolymers, (SEPS) styrene-ethylene-propylene-styrene block copolymers, $(SB)_n$ styrene-butadiene and $(SEB)_n$, $(SEBS)_n$, $(SEP)_n$, $(SI)_n$ styrene-isoprene multiarm, branched or star-shaped copolymers and the like. Still, other polymers include homopolymers which can be utilized in minor amounts; these include: polystyrene, polybutylene, polyethylene, polypropylene and the like.

The variations in formulations for creating the oil-free viscoelastic gels, which may be beneficially applied to a person's skin, can be best illustrated through reference to the following Examples. These Examples and data provide a basis for understanding the metes and bounds of the invention and are not to be taken as a limitation upon the overall scope of the present invention.

Example 1

A SEPTON SEB triblock copolymer with an S/EB ratio of 29:71, is melt blended with HEST I-20-18B, an octyldodecyl isostearate, a double-branched ester, from the Global Seven Company. For every 100 parts of the SEB polymer an eight-fold amount (800 parts) of the ester was employed. The initial combination was prepared by addition of the HEST I-20-18B to granulated triblock polymer.

The resulting product has superior tensile strength and high elongation, excellent memory, is suitable for cast molding and is capable of repeated handling with no plasticizer bleed out. This particular composition can be molded into a substrate material, e.g., a cushion, such as a wheelchair cushion, with a fabric cover. The substrate material could also be, for example, a wrist band or a back support.

Example 2

A melt blend is prepared from 100 parts of Kuraray's SEPTON 4055 SEEPS (a (styrene-ethylene/ethylene-propylene-styrene) block polymer made from hydrogenated styrene isoprene/butadiene block copolymer) mixed with 450 parts of Alzo's DERMOL DISD (Diisostearyl Dimer Dilinoleate) at room temperature to form a paste-like mixture; and then heated uniformly to about 165° C. until a homogeneous molten blend is obtained. The mixture is then cooled to ambient temperature.

The gel in this example resists tearing under tensile loads or during deformation, so that any surface breaks caused by stretching or deformation do not readily propagate further through the gel.

While only several embodiments of the present invention have been shown and described, it will be obvious to those skilled in the art that many modifications may be made to the present invention without departing from the spirit and scope thereof.

What is claimed is:

1. A composite article for applying to human skin, comprising:
    a thermoplastic gelatinous elastomer composition formed into a composite by heat with a substrate material, said gelatinous elastomer composition including:
        a hydrogenated styrene isoprene/butadiene block copolymer;
        a non-oil plasticizer comprising octyldodecyl myristate and an animal-derived non-oil material for imparting an esthetic property and emolliency to a cosmetic formulation; and,
        a polymer or copolymer selected from the group consisting of poly(styrene-butadiene-styrene), poly(styrene-butadiene), poly(styrene-isoprene-styrene), poly(styrene-isoprene), poly(styrene-ethylene-propylene), poly(styrene-ethylene-propylene-styrene), poly(styrene-ethylene-butylene-styrene, poly(styrene-ethylene-butylene) and combination thereof,
    said gelatinous elastomer composition having no oil-based plasticizer and having no plasticizing oil.

2. The composite article for applying to human skin according to claim 1, wherein said polymer or copolymer is made from an additional hydrogenated styrene isoprene/butadiene styrene block copolymer.

3. The composite article for applying to human skin according to claim 2, wherein said hydrogenated styrene isoprene/butadiene styrene block copolymer is made with 2-methyl-1,3-butadiene and 1,3-butadiene.

4. The composite article for applying to human skin according to claim 1, wherein said animal-derived non-oil material for imparting an esthetic property and emolliency to the cosmetic formulation includes a member selected from the group consisting of lanolin, a derivative of lanolin, squalene, a cholesterol ester and a combination thereof.

5. The composite article for applying to human skin according to claim 1, wherein said non-oil plasticizer includes isodecyl- and isooctyl-based esters selected from the group consisting of isodecyl- and isooctyl dodecyl myristate and isostearate, isodecyl- and isooctyl isocetyl stearate and isostearate, Glycereth-18 ethyl hexanoate and a combination thereof.

6. A composite article for applying to human skin, comprising:
   a thermoplastic gelatinous elastomer composition formed into a composite by heat with a substrate material, said gelatinous elastomer composition including:
      a hydrogenated styrene isoprene/butadiene block copolymer;
      a non-oil plasticizer comprising isodecyl- and isooctyl-based esters selected from the group consisting of isodecyl- and isooctyl dodecyl myristate and isostearate, isodecyl- and isooctyl isocetyl stearate and isostearate, Glycereth-18 ethyl hexanoate, octyldodecyl myristate and a combination thereof, and an animal-derived non-oil material comprising a cholesterol ester for imparting an esthetic property and emolliency to a cosmetic formulation; and,
      a polymer or copolymer selected from the group consisting of poly(styrene-butadiene-styrene), poly(styrene-butadiene), poly(styrene-isoprene-styrene), poly(styrene-isoprene), polystyrene-ethylene-propylene), poly(styrene-ethylene-propylene-styrene), poly(styrene-ethylene-butylene-styrene, poly(styrene-ethylene-butylene) and combination thereof,
   said gelatinous elastomer composition having no oil-based plasticizer and having no plasticizing oil.

7. The composite article for applying to human skin according to claim 6, wherein said polymer or copolymer is made from an additional hydrogenated styrene isoprene/butadiene styrene block copolymer.

8. The composite article for applying to human skin according to claim 7, wherein said hydrogenated styrene isoprene/butadiene styrene block copolymer is made with 2-methyl-1,3-butadiene and 1,3-butadiene.

9. The composite article for applying to human skin according to claim 6, wherein said animal-derived non-oil material for imparting an esthetic property and emolliency to the cosmetic formulation includes a member selected from the group consisting of lanolin, a derivative of lanolin, squalene and a combination thereof.

10. A composite article for applying to human skin, comprising:
    a thermoplastic gelatinous elastomer composition formed into a composite by heat with a substrate material, said gelatinous elastomer composition including:
       a hydrogenated styrene isoprene/butadiene block copolymer;
       a non-oil plasticizer comprising an ester having fatty acids, and an animal-derived non-oil material including a cholesterol for imparting an esthetic property and emolliency to a cosmetic formulation; and,
       a polymer or copolymer selected from the group consisting of poly(styrene-butadiene-styrene), poly(styrene-butadiene), poly(styrene-isoprene-styrene), poly(styrene-isoprene), poly(styrene-ethylene-propylene), poly(styrene-ethylene-propylene-styrene), poly(styrene-ethylene-butylene-styrene, poly(styrene-ethylene-butylene) and combination thereof,
    said gelatinous elastomer composition having no oil-based plasticizer and having no plasticizing oil.

11. The composite article for applying to human skin according to claim 10, wherein said polymer or copolymer is made from an additional hydrogenated styrene isoprene/butadiene styrene block copolymer.

12. The composite article for applying to human skin according to claim 11, wherein said hydrogenated styrene isoprene/butadiene styrene block copolymer is made with 2-methyl-1,3-butadiene and 1,3-butadiene.

13. The composite article for applying to human skin according to claim 10, wherein said cholesterol of said animal-derived non-oil material for imparting an esthetic property and emolliency to the cosmetic formulation is a cholesterol ester.

\* \* \* \* \*